(12) United States Patent
Shimizu

(10) Patent No.: US 8,964,205 B2
(45) Date of Patent: Feb. 24, 2015

(54) PRINT CONTROL APPARATUS, INKJET PRINTING APPARATUS, PRINT CONTROL METHOD, AND RECORDING MEDIUM WITH DATA COMPRESSION/DECOMPRESSION

(71) Applicant: Dainippon Screen Mfg. Co., Ltd., Kyoto (JP)

(72) Inventor: Katsuhisa Shimizu, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 0 days.

(21) Appl. No.: 13/747,564

(22) Filed: Jan. 23, 2013

(65) Prior Publication Data

US 2013/0250341 A1 Sep. 26, 2013

(30) Foreign Application Priority Data

Mar. 26, 2012 (JP) .................. 2012-068921

(51) Int. Cl.
 *G06K 15/02* (2006.01)
 *G06K 15/12* (2006.01)

(52) U.S. Cl.
 CPC ............ *G06K 15/02* (2013.01); *G06K 15/1817* (2013.01); *G06K 15/1807* (2013.01); *G06K 15/181* (2013.01); *G06K 15/12* (2013.01)
 USPC ............ 358/1.14; 358/1.1; 382/233; 382/309

(58) Field of Classification Search
 CPC ......... G06K 15/00; G06K 15/02; H04N 1/00; H04N 1/41; G06F 12/08; G06F 2212/40; G06F 2212/401
 USPC ................ 358/1.1, 1.14, 400, 401, 426.01, 358/426.04, 434; 382/232, 233, 309
 See application file for complete search history.

(56) References Cited

U.S. PATENT DOCUMENTS 6,654,867 B2 * 11/2003 Wilson et al. .................. 711/213
2006/0150093 A1 * 7/2006 Chen ............................. 715/518

FOREIGN PATENT DOCUMENTS

| JP | 3-196760 | 8/1991 |
| JP | 4-265057 | 9/1992 |
| JP | 5-049020 | 2/1993 |

* cited by examiner

*Primary Examiner* — Thomas D Lee
(74) *Attorney, Agent, or Firm* — Ostrolenk Faber LLP

(57) ABSTRACT

Compressed data transmitted to a print control apparatus includes break data having information on a compressed size and a decompressed size for each page. When the compressed data is transferred to a decompressing unit, the break data is converted to NOP data. Information on the decompressed size included in each break data is provided to a checking unit. During a period in which a decompression process is performed, a decompression flag is turned on. The checking unit obtains the actual decompressed size by counting a period in which the decompression flag is turned on, to check whether the decompression process has been normally performed. During a period in which the decompressing unit and the checking unit perform processes for a certain page, a reading unit reads compressed data for the next page.

10 Claims, 10 Drawing Sheets

Fig.5
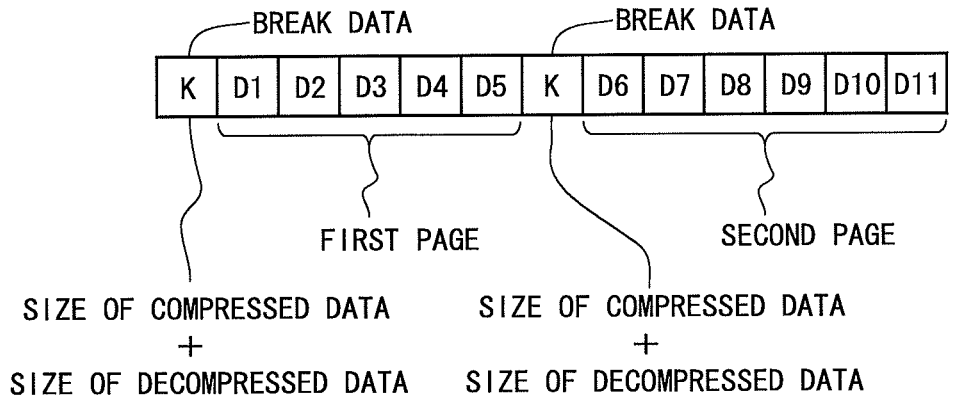
Fig.6
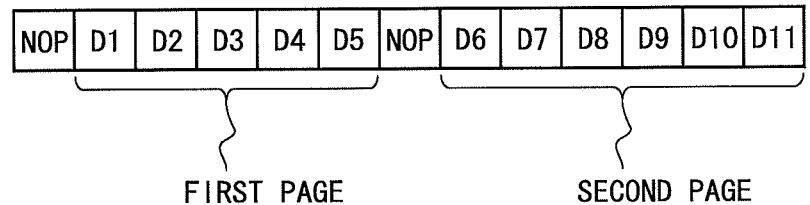
Fig.7A COMPRESSED DATA 
Fig.7B DECOMPRESSED DATA 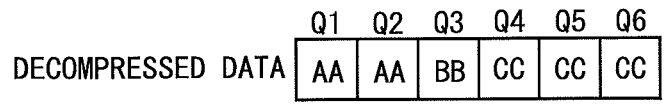

Fig.9
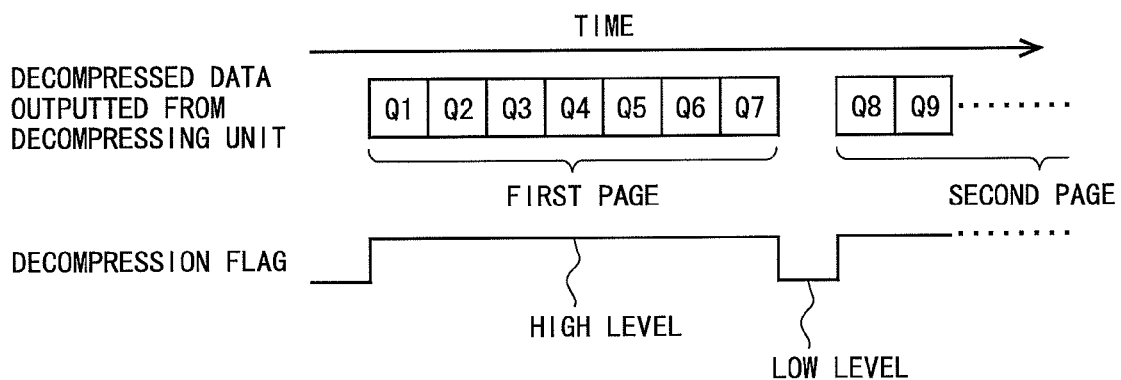
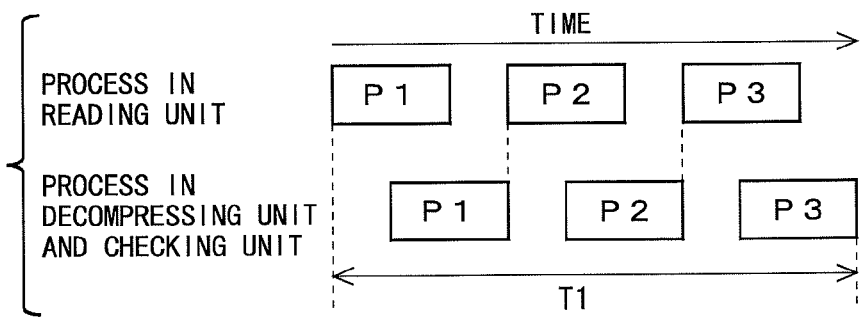
Fig.10A
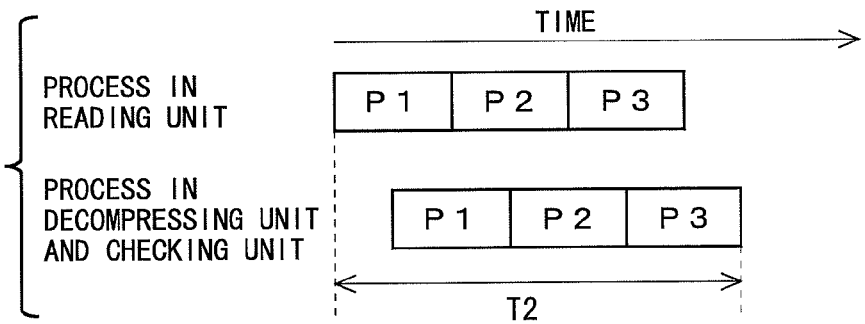
Fig.10B

PRINT CONTROL APPARATUS, INKJET PRINTING APPARATUS, PRINT CONTROL METHOD, AND RECORDING MEDIUM WITH DATA COMPRESSION/DECOMPRESSION

BACKGROUND OF THE INVENTION

1. Field of the Invention

The present invention relates to a print control apparatus that generates data for print output by performing a decompression process on compressed data.

2. Description of Background Art

Conventionally, there is known a printing system configured by a printing apparatus such as an inkjet printing apparatus; and a host (typically, a computer called a "server") which is a transmission source of print data. In such a printing system, when comparing the data transfer rate between the host and the printing apparatus with the printing speed of the printing apparatus, generally, the printing speed of the printing apparatus is higher. Therefore, when image data to be printed is transmitted to the printing apparatus from the host as it is, the printing apparatus cannot perform printing at its original printing speed (the printing apparatus needs to stop printing at times). Hence, when performing printing, compressed image data is transmitted to the printing apparatus from the host.

FIG. 11 is a diagram schematically showing the flow of data when an inkjet printing apparatus performs printing. When performing printing, first, image data to be printed is compressed by a host. Then, the compressed data is transmitted to a print control apparatus in the inkjet printing apparatus from the host. The compressed data is temporarily stored in a memory in the print control apparatus. Thereafter, the print control apparatus reads the compressed data from the memory and performs the process of decompressing the read compressed data. Then, the decompressed data is transmitted to a print head unit of a printer main body, and print output (printing on print paper) is performed.

However, when there is an error in compressed data which is read from the memory, decompression of the data cannot be correctly performed. Note that the causes of the error in compressed data include, for example, memory failure, malfunction due to noise or the like, and data loss in a data transmission path between the host and the print control apparatus. When the printing apparatus prints a large amount of pages, if only certain density data (pixel value data) included in compressed data is not correctly decompressed, only printed matter of a page including the density data results in a defect (print failure). However, if an error occurs in post-decompression data size for a certain page, printed matter of all pages after the page results in a defect. For example, when print output of images such as those shown in FIG. 12A are to be performed originally, if the post-decompression data size is smaller than the original one, printing results are such as those shown in, for example, FIG. 12B. In this example, printed matter of all three pages results in a defect.

As a method for handling an error such as that described above, there is a method (hereinafter, referred to as a "first conventional technique") in which an error in a decompression process is detected by counting the number of decompressed data (e.g., the number of bytes) and comparing a value obtained by the counting with an expected value (a post-decompression data size which is notified in advance to the printing apparatus from the host). However, since the print control apparatus performs pipeline processing for a higher processing speed, a decompressing unit that performs a decompression process is continually given compressed data that does not include page break information, as shown in FIG. 13. Hence, even when a decompression process is performed on compressed data shown in, for example, FIG. 13, a distinction cannot be made between a decompression result for the first page and a decompression result for the second page. Therefore, an error in decompression process can be detected only after obtaining a post-decompression data size for all page, i.e., after completing print output of all pages. Hence, print output cannot be stopped at the time of the occurrence of an error in decompression process, resulting in waste of print paper and ink.

In view of this, there is considered a method (hereinafter, referred to as a "second conventional technique") in which reading of compressed data is performed on a page-by-page basis and a post-decompression data size (hereinafter, referred to as a "decompressed size") is checked each time a decompression process of compressed data for one page is completed. A processing procedure of the second conventional technique will be described below with reference to a flowchart shown in FIG. 14. Note that this process is performed by a print control apparatus. First, a receiving unit in the print control apparatus receives compressed data transmitted from a host (step S90). In addition, aside from the compressed data, information on a decompressed size for each page is transmitted from the host. The receiving unit notifies a checking unit of the decompressed sizes (step S91). Then, the compressed data is written to a memory (step S92). When compressed data of a certain fixed value is written to the memory, a reading unit in the print control apparatus reads the compressed data from the memory and transfers the read compressed data to a decompressing unit (step S93). Note that, in the second conventional technique, the compressed data includes break data including information on the size of compressed data (hereinafter, referred to as a "compressed size") for each page. Based on the information on the compressed sizes, compressed data is transferred on a page-by-page basis to the decompressing unit from the reading unit. When the compressed data is transferred to the decompressing unit, the decompressing unit performs a decompression process (step S94). During a period in which the decompression process is performed, the decompressing unit turns on a decompression flag which is a flag indicating whether a decompression process is performed, and the checking unit counts the period in which the decompression flag is turned on. When the decompression process is completed, the decompression flag is turned off, and the checking unit checks whether the decompression process has been correctly performed (step S95). This check is performed by comparing a value obtained by the counting with a value of a corresponding decompressed size which is notified in step S91. As a result of the check, when the values match, it is determined that "the decompression process has been correctly performed", and when the values do not match, it is determined that "the decompression process has not been correctly performed". When the decompression process has been correctly performed, processing returns to step S93, and reading of compressed data for the next page from the memory is performed. On the other hand, when the decompression process has not been correctly performed, an error process such as stopping print output is performed (step S96). In the above-described manner, whether a decompression process is correctly performed can be checked on a page-by-page basis.

Note that, in connection with this invention, JP 03-196760 A and JP 04-265057 A describe that break marks (break data) indicating breaks between pages are added to data to be transmitted and received. In addition, JP 05-49020 A describes that information indicating the length of compressed data is included in a break code of the compressed data.

However, according to the second conventional technique, during a period after reading compressed data for a certain page from the memory until a check of a decompression result for the page is completed, compressed data for the next page cannot be read from the memory. Hence, the printing apparatus cannot perform printing at its original printing speed. In addition, according to the first conventional technique, as described above, print output cannot be stopped at the time of the occurrence of an error in decompression process, resulting in waste of print paper and ink.

SUMMARY OF THE INVENTION

An object of the present invention is therefore to promptly detect an error in decompression of compressed data without reducing the printing speed of a printing apparatus.

To achieve the object, the present invention has features such as those described below.

One aspect of the present invention is directed to a print control apparatus that receives compressed data obtained by compressing data to be printed, and generates data for print output by decompressing the compressed data, the print control apparatus including:

a storage unit that stores the compressed data transmitted from an external source;

a reading unit that reads the compressed data from the storage unit on a unit data by unit data basis, the unit data being a predetermined block;

a decompressing unit that performs a decompression process on the compressed data read by the reading unit; and a checking unit that checks whether a post-decompression data size of each unit data obtained by the decompression process performed by the decompressing unit is correct, wherein each unit data in the compressed data includes break data as first data and includes, as data following the break data, density data, the number of which is according to a data size in a compressed state, the break data including information on the data size in the compressed state and information on the post-decompression data size, the checking unit determines whether the post-decompression data size of each unit data is correct, based on information on the post-decompression data size included in corresponding break data, and during a period in which the decompressing unit performs the decompression process on certain unit data and during a period in which the checking unit checks the certain unit data, the reading unit can read compressed data for next unit data from the storage unit.

According to such a configuration, when print output is performed, compressed data including break data having information on a compressed size and a decompressed size for each unit data is transmitted to the print control apparatus from an external source. Then, the checking unit checks, for each unit data, whether a decompression process has been correctly performed, based on the decompressed size included in corresponding break data. Herein, during a period in which a decompression process and a check are performed on certain unit data, reading of the next unit data from the storage unit can be performed. By this, an error in decompression can be promptly detected without reducing the printing speed of the printing apparatus.

In such an apparatus, it is preferred that the decompressing unit turns on a decompression flag during a period in which the decompression process is performed on the compressed data, the decompression flag being a flag indicating whether the decompression process is performed; and the checking unit obtains the post-decompression data size of each unit data by counting a period in which the decompression flag is turned on.

According to such a configuration, the checking unit can obtain the decompressed size for each unit data without requiring information on the decompressed size which is conventionally transmitted from an external source separately from compressed data. By this, the data communication time is reduced, and a reduction in printing speed is effectively suppressed.

In such an apparatus, it is preferred that the reading unit includes, as non-processing data, the break data in the compressed data to be subjected to the decompression process by the decompressing unit, the non-processing data not being subjected to the decompression process, and when the decompressing unit detects the non-processing data, the decompressing unit turns off the decompression flag.

According to such a configuration, even when decompression processes for a plurality of pages are consecutively performed, the decompressed size for each unit data can be securely obtained.

In such an apparatus, it is preferred that the print control apparatus further includes a control unit that instructs to stop print output performed based on the data for print output, when the checking unit determines that the post-decompression data size is not correct.

According to such a configuration, when the post-decompression data size is not correct, print output is stopped or an operator is notified of an error. Since these processes are performed on a unit data by unit data basis (e.g., on a page-by-page basis), when there is an error in decompression process, the occurrence of wasteful print paper or wasteful ink is restrained.

Another aspect of the present invention is directed to an inkjet printing apparatus including a print control apparatus that receives compressed data obtained by compressing data to be printed, and generates data for print output by decompressing the compressed; and a printing unit that performs printing on print paper based on the data for print output, wherein the print control apparatus includes:

a storage unit that stores the compressed data transmitted from an external source;

a reading unit that reads the compressed data from the storage unit on a unit data by unit data basis, the unit data being a predetermined block;

a decompressing unit that performs a decompression process on the compressed data read by the reading unit; and a checking unit that checks whether a post-decompression data size of each unit data obtained by the decompression process performed by the decompressing unit is correct, each unit data in the compressed data includes break data as first data and includes, as data following the break data, density data, the number of which is according to a data size in a compressed state, the break data including information on the data size in the compressed state and information on the post-decompression data size, the checking unit determines whether the post-decompression data size of each unit data is correct, based on information on the post-decompression data size included in corresponding break data, and during a period in which the decompressing unit performs the decompression process on certain unit data and during a period in which the checking unit checks the certain unit data, the reading unit can read compressed data for next unit data from the storage unit.

Still another aspect of the present invention is directed to a non-transitory computer-readable recording medium having recorded thereon a print control program for causing a print control apparatus, which receives compressed data obtained by compressing data to be printed and generates data for print output by decompressing the compressed data, to execute:

a storing step of storing the compressed data in a predetermined storage unit;

a reading step of reading the compressed data from the storage unit on a unit data by unit data basis, the unit data being a predetermined block;

a decompressing step of performing a decompression process on the compressed data read in the reading step; and a checking step of checking whether a post-decompression data size of each unit data obtained by the decompression process in the decompressing step is correct, wherein each unit data in the compressed data includes break data as first data and includes, as data following the break data, density data, the number of which is according to a data size in a compressed state, the break data including information on the data size in the compressed state and information on the post-decompression data size, in the checking step, whether the post-decompression data size of each unit data is correct is determined, based on information on the post-decompression data size included in corresponding break data, and during a period in which the decompression process on certain unit data is performed in the decompressing step and during a period in which the certain unit data is checked in the checking step, compressed data for next unit data can be read from the storage unit in the reading step.

Yet another aspect of the present invention is directed to a print control method for generating data for print output by decompressing compressed data obtained by compressing data to be printed, the method including:

a storing step of storing the compressed data in a predetermined storage unit;

a reading step of reading the compressed data from the storage unit on a unit data by unit data basis, the unit data being a predetermined block;

a decompressing step of performing a decompression process on the compressed data read in the reading step; and a checking step of checking whether a post-decompression data size of each unit data obtained by the decompression process in the decompressing step is correct, wherein each unit data in the compressed data includes break data as first data and includes, as data following the break data, density data, the number of which is according to a data size in a compressed state, the break data including information on the data size in the compressed state and information on the post-decompression data size, in the checking step, whether the post-decompression data size of each unit data is correct is determined, based on information on the post-decompression data size included in corresponding break data, and during a period in which the decompression process on certain unit data is performed in the decompressing step and during a period in which the certain unit data is checked in the checking step, compressed data for next unit data can be read from the storage unit in the reading step.

These and other objects, features, aspects, and advantages of the present invention will become more apparent from the following detailed description of the present invention with reference to the accompanying drawings.

BRIEF DESCRIPTION OF THE DRAWINGS

FIG. 5 is a diagram showing a configuration of compressed data in the embodiment.

FIG. 6 is a diagram showing a configuration of compressed data provided to a decompressing unit from a reading unit in the embodiment.

FIGS. 7A and 7B are diagrams for describing a decompression process in the embodiment.

FIG. 9 is a diagram for describing counting of a period in which a decompression process is performed in the embodiment.

FIGS. 10A and 10B are diagrams for describing effects brought about in the embodiment.

DESCRIPTION OF PREFERRED EMBODIMENTS

An embodiment of the present invention will be described below with reference to the accompanying drawings.

<1. Overall Configuration>

Figure 2:
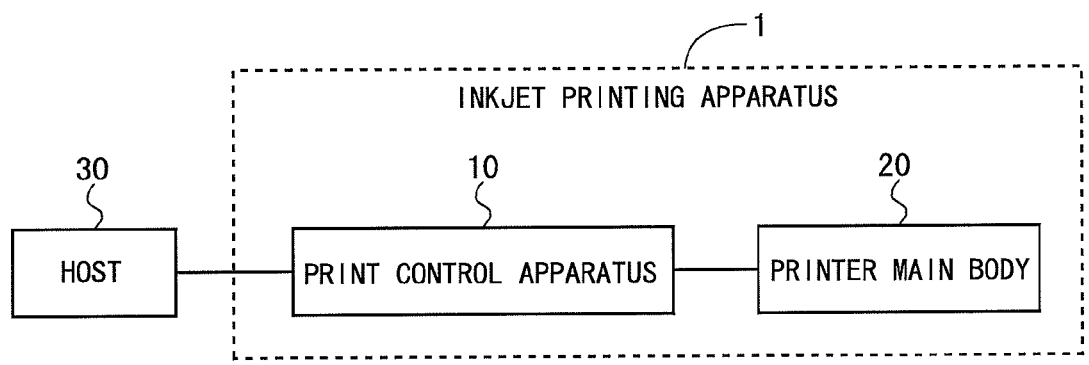
FIG. 2 is a block diagram showing a configuration of an entire printing system according to the embodiment.

FIG. 2 is a block diagram showing a configuration of an entire printing system according to an embodiment of the present invention. The printing system is configured by an inkjet printing apparatus 1 and a host 30. The inkjet printing apparatus 1 is configured by a printer main body 20 and a print control apparatus 10 which is a control apparatus for the printer main body 20. In the printing system, the host 30 functions as a transfer apparatus that transfers compressed data to be printed (hereinafter, referred to simply as "compressed data") to the print control apparatus 10. More specifically, the host 30 converts data to be printed from a vector format to a raster format by a RIP (Raster Image Processor), and performs run-length compression, e.g., a PackBits scheme, on the converted data, thereby obtaining compressed data. Then, the host 30 transfers the compressed data to the print control apparatus 10. Note that a relatively high-performance computer, called a "server", is typically adopted as the host 30. For an interface between the host 30 and the print control apparatus 10, for example, an optical interface with a transfer rate of 2 Gbps, 4 Gbps, or the like, is adopted. The print control apparatus 10 receives the compressed data transmitted from the host 30 and decompresses the compressed data to generate data for print output to be outputted as printed matter from the printer main body 20. The print control apparatus 10 then transmits the data for print output to the printer main body 20. Note that detailed description of the print control apparatus 10 will be made later. The printer main body 20 receives the data for print output transmitted from the print control apparatus 10 and performs print output (printing on print paper).

Figure 3:
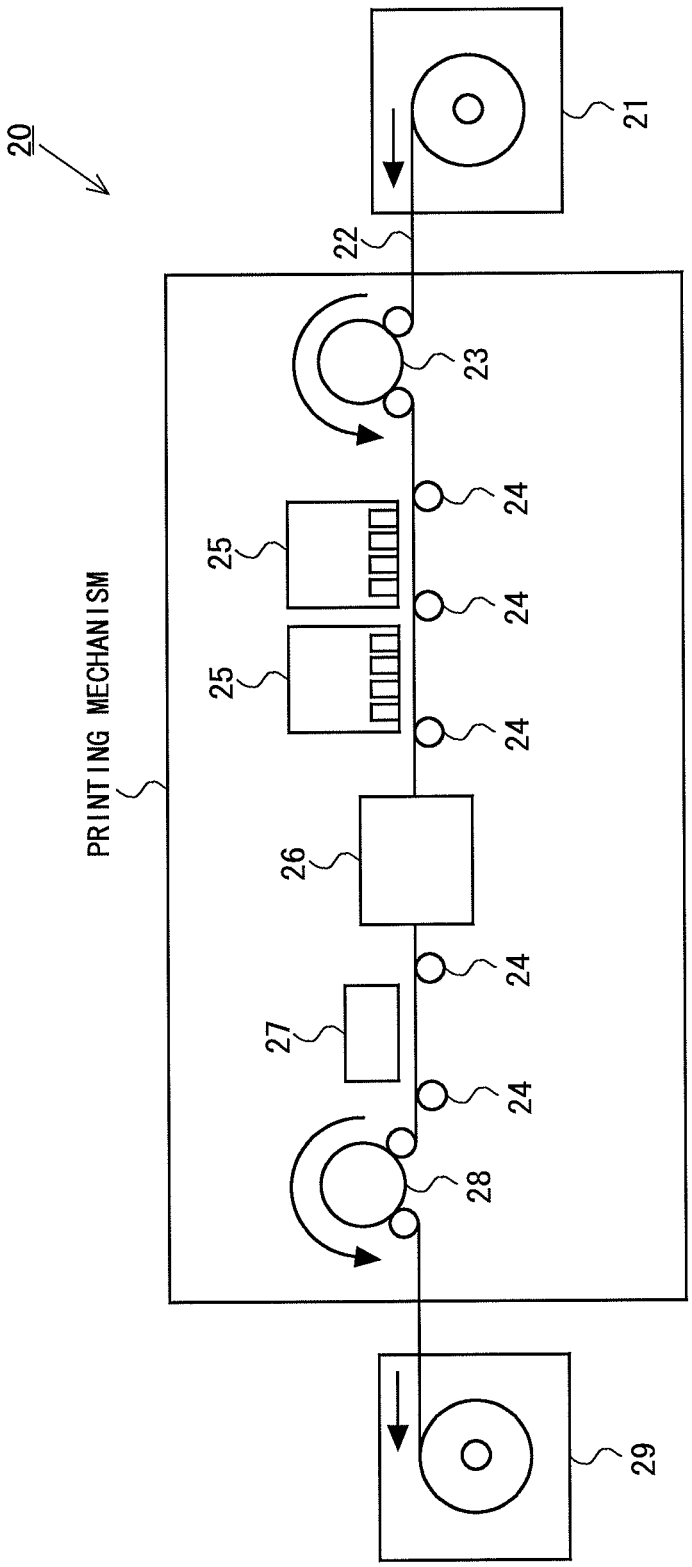
FIG. 3 is a diagram showing a configuration of a printer main body of an inkjet printing apparatus in the embodiment.

FIG. 3 is a diagram showing a configuration of the printer main body 20 of the inkjet printing apparatus 1. The printer main body 20 includes a roll-out unit 21 that supplies print paper; a first transport mechanism 23 for transporting a medium 22 which is print paper into a printing mechanism; a plurality of rollers 24 for transporting the medium (print paper) 22 in the printing mechanism; discharging units 25 that perform printing by discharging ink onto the medium (print paper) 22; a drying unit 26 that dries the printed medium (print paper) 22; a checking unit 27 that checks the state of printing performed on the medium (print paper) 22; a second transport mechanism 28 for outputting the medium (print paper) 22 from the printing mechanism; and a roll-up unit 29 that rolls up the printed medium (print paper) 22. In such a configuration, when an instruction for print output is provided, the medium (print paper) 22 is transported from the roll-out unit 21 to the roll-up unit 29. In the course of the transport, first, the discharging units 25 performs printing by discharging ink, and then the drying unit 26 dries the medium (print paper) 22, and finally the checking unit 27 checks the print state.

<2. Configuration and Operation of Print Control Apparatus>

Figure 4:
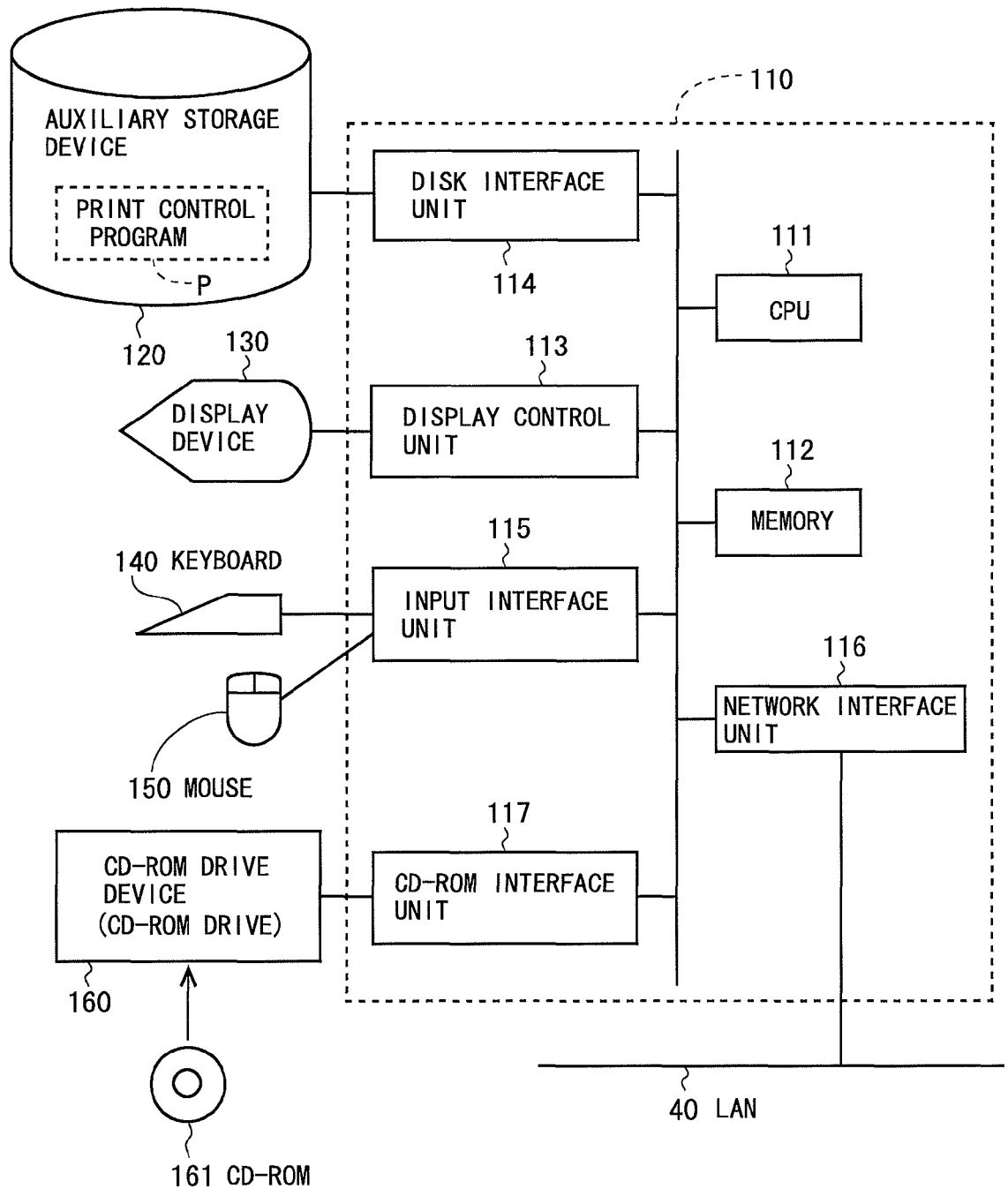
FIG. 4 is a hardware configuration diagram of the print control apparatus in the embodiment.

FIG. 4 is a hardware configuration diagram of the print control apparatus 10. The print control apparatus 10 includes a main body 110; an auxiliary storage device 120 such as a magnetic disk device; a display device 130 such as a CRT; input devices such as a keyboard 140 and a mouse 150; and a CD-ROM drive device (CD-ROM drive) 160. The main body 110 includes a CPU 111, a memory (RAM) 112, a display control unit 113, a disk interface unit 114, an input interface unit 115, a network interface unit 116, and a CD-ROM interface unit 117. The display device 130 is connected to the display control unit 113. The auxiliary storage device 120 is connected to the disk interface unit 114. The input devices are connected to the input interface unit 115. The CD-ROM drive device 160 is connected to the CD-ROM interface unit 117. In addition, the print control apparatus 10 is connected to a LAN 40 by the network interface unit 116.

A program for performing printing (hereinafter, referred to as a "print control program") P is stored in the auxiliary storage device 120. When the operation of the print control apparatus 10 starts, the print control program P is loaded into the memory 112 through the disk interface unit 114. Then, by the CPU 111 executing the print control program P loaded into the memory 112, a printing process is performed.

Note that the print control program P is provided by being stored on a computer-readable recording medium such as a CD-ROM or a DVD-ROM. Specifically, for example, a user buys a CD-ROM 161 serving as a recording medium for the print control program P and inserts the CD-ROM 161 into the CD-ROM drive device 160. Then, the print control program P is read from the CD-ROM 161 and installed on the auxiliary storage device 120. Alternatively, instead of this, the print control program P which is transmitted through the LAN 40 may be received and installed on the auxiliary storage device 120.

Figure 1:
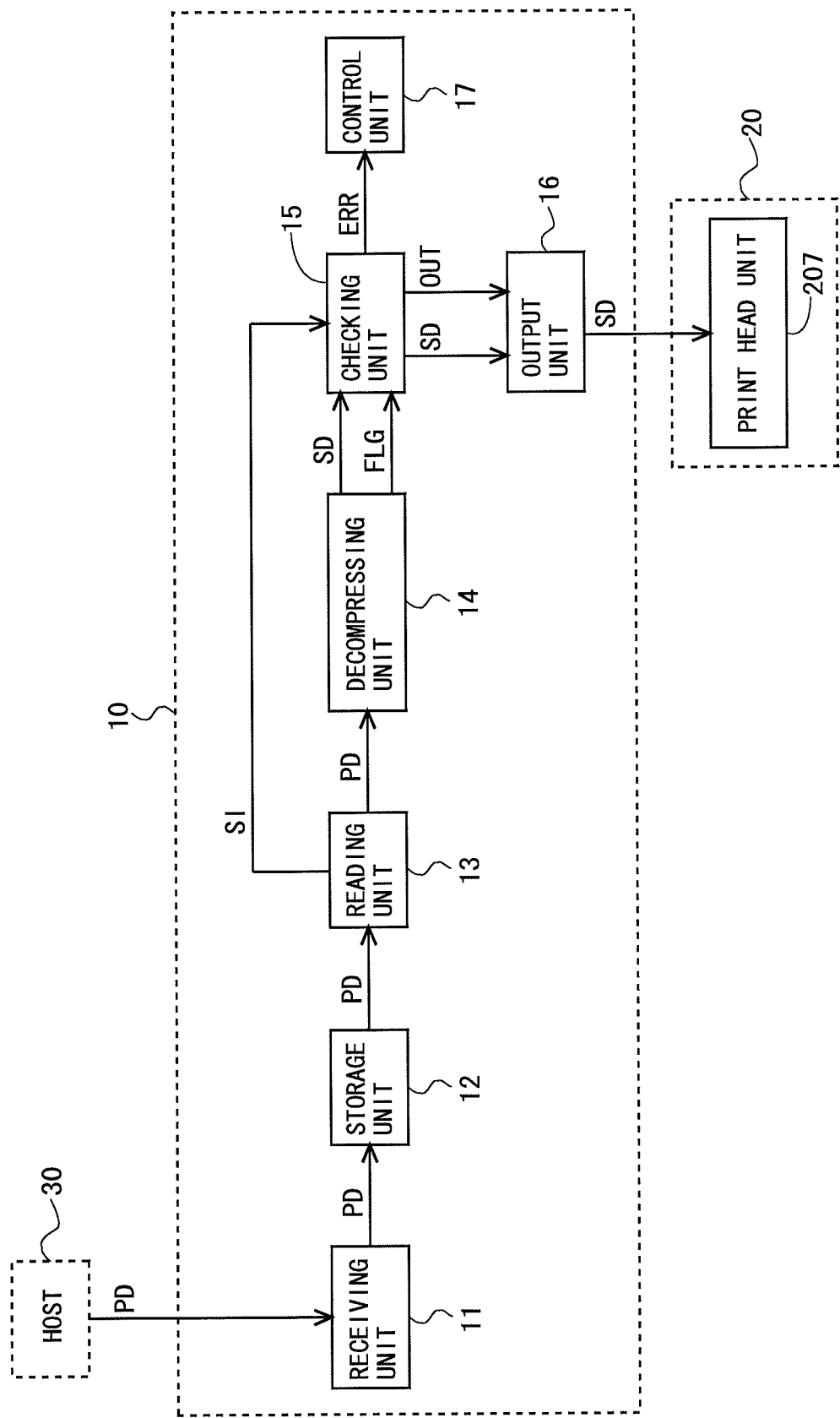
FIG. 1 is a functional block diagram showing a functional configuration of a print control apparatus in an embodiment of the present invention.

FIG. 1 is a functional block diagram showing a functional configuration of the print control apparatus 10. The print control apparatus 10 is configured, in terms of function, by a receiving unit 11, a storage unit 12, a reading unit 13, a decompressing unit 14, a checking unit 15, an output unit 16, and a control unit 17. The receiving unit 11 receives data transmitted from the host 30. When the data transmitted from the host 30 is data (command) representing a print instruction, the receiving unit 11 provides the control unit 17 with a command that allows the control unit 17 to prepare for print operation. When the data transmitted from the host 30 is compressed data PD, the receiving unit 11 writes the compressed data PD to the storage unit 12. Note that the receiving unit 11 is implemented by the network interface unit 116 in FIG. 4. The storage unit 12 is the relatively high-speed, high-capacity memory 112 such as DDR-SDRAM (Double Data Rate Synchronous Dynamic Random Access Memory), and temporarily holds the compressed data PD. The functions equivalent to those in FIG. 1 may be implemented by an integrated circuit.

Meanwhile, in the present embodiment, compressed data to be transmitted from the host 30 to the print control apparatus 10 includes break data K, as shown in FIG. 5. Specifically, break data is provided for each data for one page in the compressed data. Each break data includes information on the size of compressed data (compressed size) for a corresponding page and the post-decompression data size (decompressed size) of the compressed data. As such, in the present embodiment, unit data is implemented by data for one page. Note that compressed data is configured such that among data for each page, break data is read first. Specifically, when taking a look at data for one page in compressed data, the first data is break data, followed by density data each representing a value of each of the pixels in the page.

The reading unit 13 reads the compressed data PD stored in the storage unit 12. When the reading unit 13 reads the compressed data PD, the reading unit 13 first detects break data. As described above, since each break data includes information on a compressed size and information on a decompressed size, the reading unit 13 obtains a compressed size and a decompressed size for a page that is going to be read now. Then, the reading unit 13 notifies the checking unit 15 of a decompressed size SI obtained from the break data. In addition, the reading unit 13 reads compressed data PD for one page based on the compressed size obtained from the break data, and transfers the compressed data PD to the decompressing unit 14. Note that, at that time, the break data is provided to the decompressing unit 14, as NOP data (non-processing data) which is not subjected to a decompression process.

The decompressing unit 14 performs a decompression process that decompresses the compressed data PD provided from the reading unit 13. Then, the decompressing unit 14 provides the checking unit 15 with decompressed data SD obtained by the decompression process. For example, when a decompression process is performed on compressed data PD such as that shown in FIG. 7A, decompressed data SD such as that shown in FIG. 7B is obtained. The decompressing unit 14 also turns on a decompression flag FLG which is a flag indicating whether a decompression process is performed, during a period in which the decompression process is performed. Note that the decompression flag FLG is provided to the checking unit 15.

The checking unit 15 transmits the decompressed data SD provided from the decompressing unit 14, to the output unit 16 as data for print output, and counts the period in which the decompression flag FLG is turned on. By the counting, the checking unit 15 can obtain the actual decompressed size of data for each page. Then, the checking unit 15 compares the decompressed size obtained based on the counting with the decompressed size SI provided from the reading unit 13. When the sizes match, the checking unit 15 provides the output unit 16 with a print instruction command OUT. When the sizes do not match, the checking unit 15 provides the control unit 17 with a command ERR instructing to perform an error process.

The output unit 16 temporarily holds the decompressed data SD transmitted from the checking unit 15. Then, when the output unit 16 is provided with a print instruction command OUT from the checking unit 15, the output unit 16 outputs the decompressed data SD held therein to a print head unit 207 of the printer main body 20. The print head unit 207 performs printing on printed paper, based on the decompressed data SD transmitted from the output unit 16. When the control unit 17 is provided with a command ERR instructing to perform an error process from the checking unit 15, the control unit 17 performs, for example, the process of stopping print output or the process of notifying an operator of an error.

<3. Processing Procedure of Print Control Apparatus>

Figure 8:
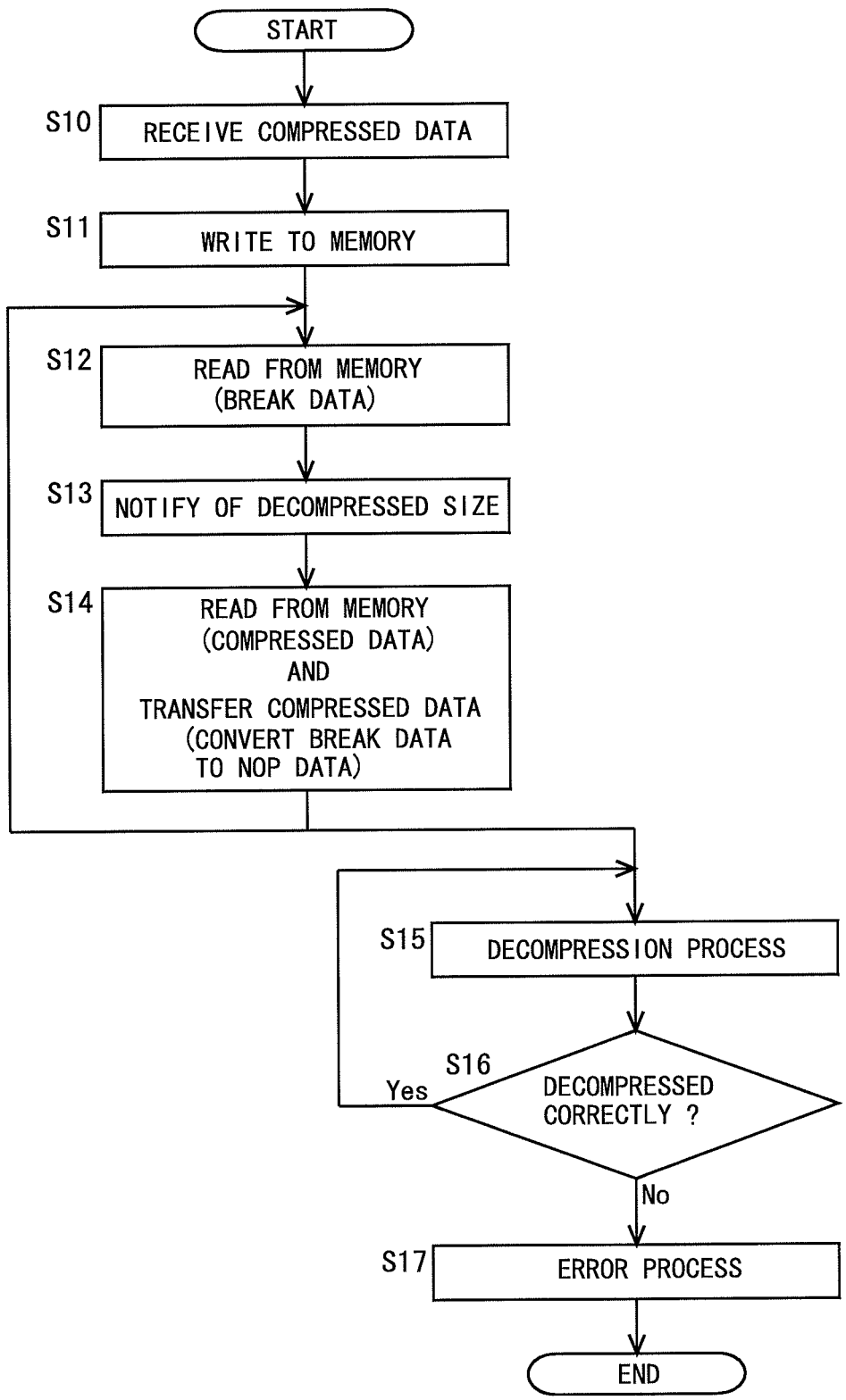
FIG. 8 is a flowchart showing a processing procedure in the print control apparatus when printing is performed in the embodiment.
Figure 11:
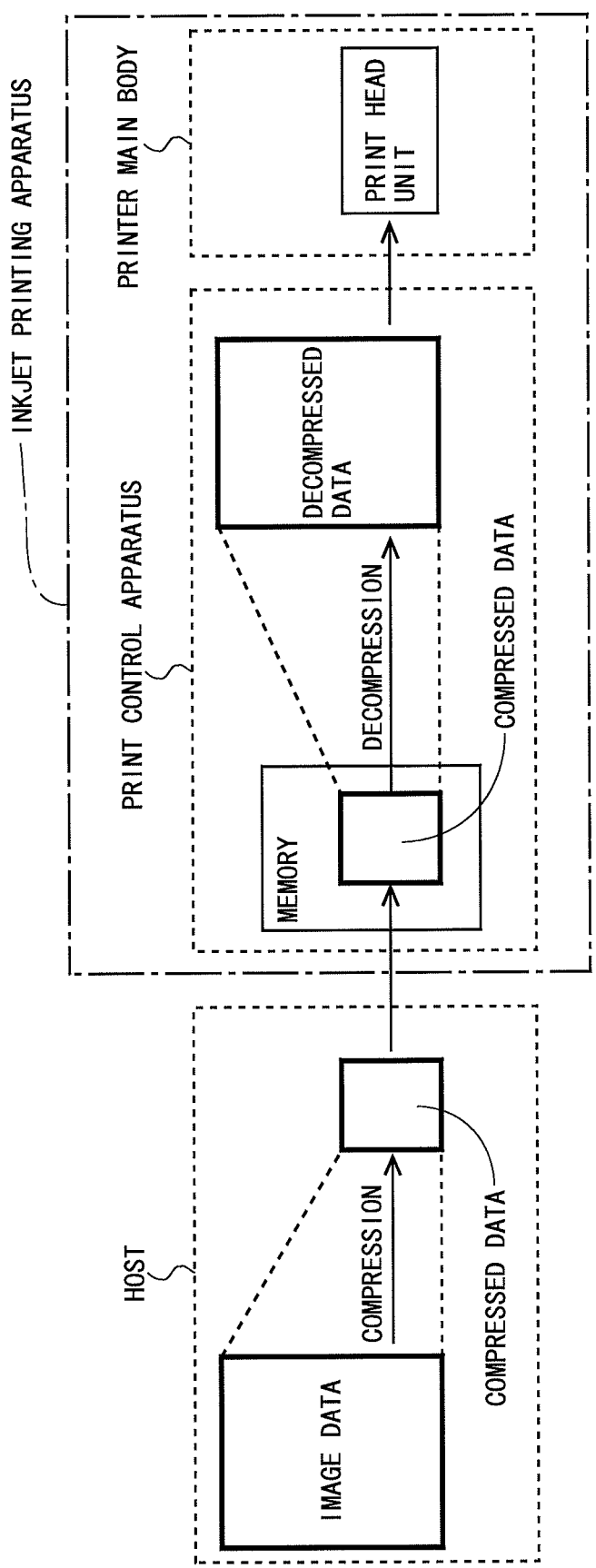
FIG. 11 is a diagram schematically showing the flow of data when an inkjet printing apparatus performs printing.
Figure 12A:
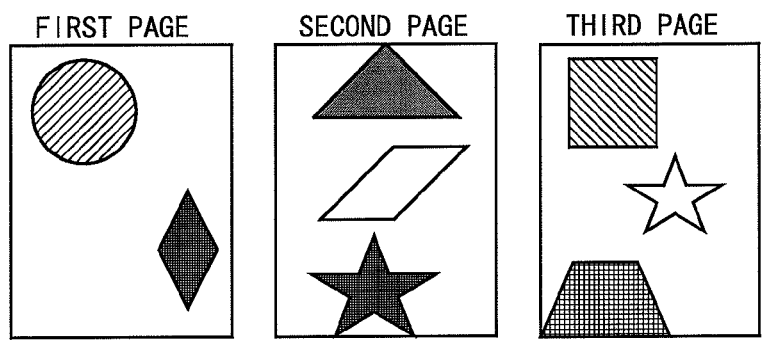
FIGS. 12A and 12B are diagrams for describing an example of occurrence of an error in post-decompression data size.
Figure 12B:
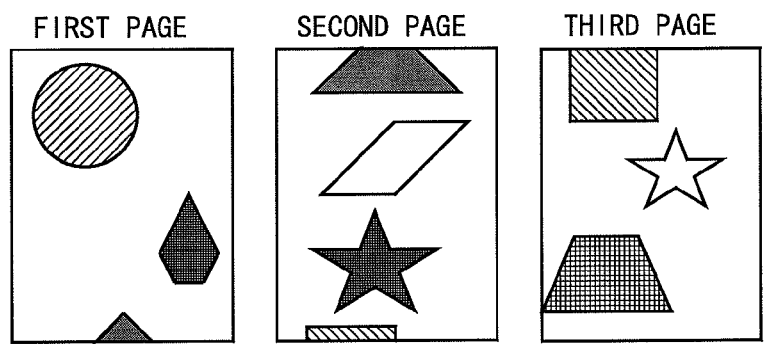
Figure 13:
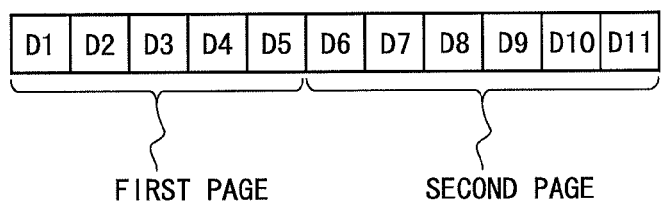
FIG. 13 is a diagram showing an exemplary configuration of compressed data in a conventional example.
Figure 14:
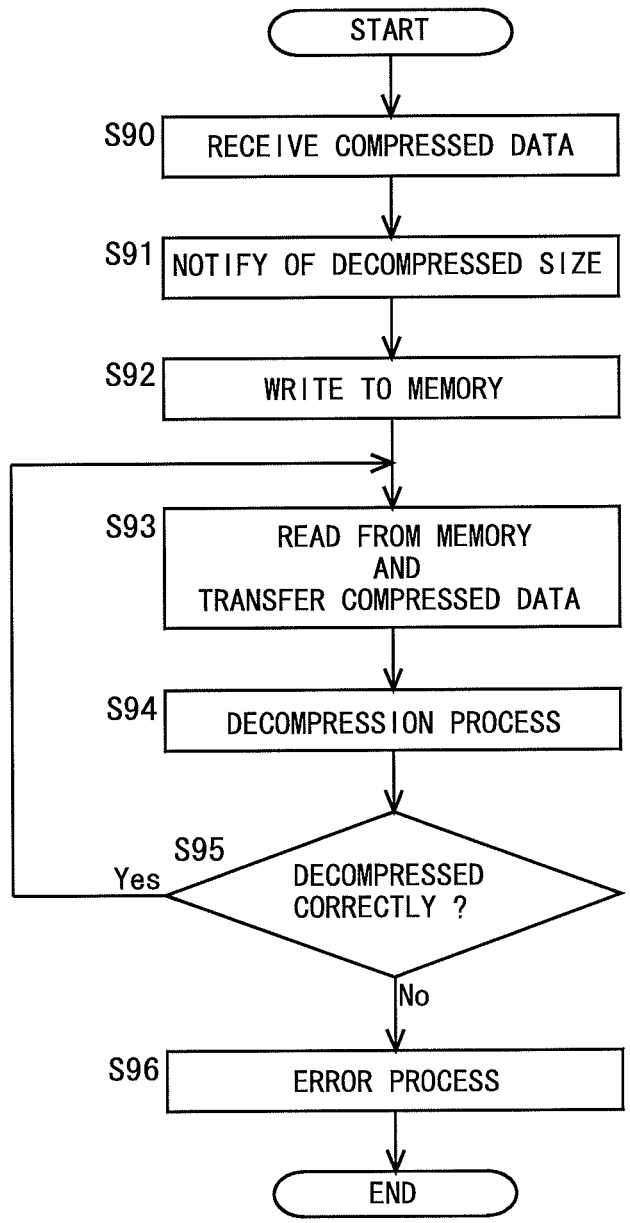
FIG. 14 is a flowchart showing a processing procedure of a second conventional technique.

Next, with reference to a flowchart shown in FIG. 8, a processing procedure in the print control apparatus 10 when printing is performed in the present embodiment will be described. First, the receiving unit 11 receives compressed data PD transmitted from the host 30 (step S10). Then, the receiving unit 11 writes the compressed data PD to the storage unit 12 (memory 112) (step S11). When compressed data PD of a certain fixed value is written to the storage unit 12, the reading unit 13 starts reading the compressed data PD from the storage unit 12. As described above, since the first data among data for each page in compressed data is break data, the reading unit 13 first detects break data (step S12). Then, the reading unit 13 notifies the checking unit 15 of a decompressed size SI included in the break data (step S13). The reading unit 13 further reads compressed data PD for one page from the storage unit 12, based on a compressed size included in the break data, and transfers the compressed data PD to the decompressing unit 14 (step S14). Note that, as described above, the break data is transferred to the decompressing unit 14, as NOP data.

Meanwhile, in the present embodiment, a process in the reading unit 13 is performed in parallel with processes in the decompressing unit 14 and the checking unit 15. Therefore, after completing the process in step S14 for a certain page, without waiting for processes in steps S15 and S16 which will be described later to be completed, processing returns to step S12 and reading of compressed data PD for the next page from the storage unit 12 is performed.

When the compressed data PD is transferred to the decompressing unit 14 in step S14, the decompressing unit 14 performs a decompression process (step S15). During a period in which the decompression process is performed, the decompressing unit 14 turns on the decompression flag FLG. The checking unit 15 counts the period in which the decompression flag FLG is turned on, which will be described with reference to FIG. 9.

FIG. 9 schematically shows timing at which decompressed data is outputted from the decompressing unit 14, and changes in decompression flag FLG. Note that Qn (n=1, 2, 3, . . . ) indicates decompressed data outputted in one clock. As for the decompression flag FLG, a high-level state indicates "on" and a low-level state indicates "off". As shown in FIG. 9, during a period in which decompressed data is outputted from the decompressing unit 14, the decompression flag FLG is turned on. For example, when the period during which the decompression flag FLG is turned on corresponds to 1000 clocks and 2-byte data is outputted per clock from the decompressing unit 14, the decompressed size is 2000 bytes. In the example shown in FIG. 9, the checking unit 15 counts the number of clocks to "7" during a period in which decompressed data for the first page is outputted from the decompressing unit 14.

When the decompressing unit 14 detects NOP data, the decompressing unit 14 turns off the decompression flag FLG. By this, the checking unit 15 checks whether the decompression process has been correctly performed on the data for one page (step S16). This check is performed by comparing a value obtained based on the counting during the period in which the decompression process is performed, with a value of the decompressed size SI which is notified in step S13. As a result of the check, when the values match, it is determined that "the decompression process has been correctly performed", and when the values do not match, it is determined that "the decompression process has not been correctly performed". When the decompression process has been correctly performed, processing returns to step S15 and a decompression process for compressed data PD for the next page is performed. On the other hand, when the decompression process has not been correctly performed, an error process such as stopping print output is performed (step S17).

<4. Effects>

According to the present embodiment, when the inkjet printing apparatus 1 performs print output, compressed data PD including break data having information on a compressed size and a decompressed size for each page is transmitted from the host 30 to the print control apparatus 10. Information on the decompressed size included in each break data is provided to the checking unit 15. The checking unit 15 obtains, for each data for one page, the actual decompressed size based on the counting of the number of clocks during a period in which the decompression process is performed. By this, an error in decompression of compressed data PD can be detected on a page-by-page basis. Here, in the present embodiment, during a period in which the decompression process and the check are performed for a certain page, reading of compressed data PD for the next page from the memory 112 can be performed. Hence, a reduction in printing speed caused by performing a check on a page-by-page basis is suppressed, which will be described with reference to FIGS. 10A and 10B. FIGS. 10A and 10B schematically show the time required for a process for data for three pages (P1 to P3) in the second conventional technique and the present embodiment. In the second conventional technique, until a check of a decompression result for a certain page is completed, the reading unit can not perform reading of compressed data for the next page from the memory. Therefore, a period in which the reading unit performs a process and a period in which the decompressing unit and the checking unit perform processes are such as those shown in FIG. 10A. On the other hand, in the present embodiment, processes in the decompressing unit and the checking unit can be performed in parallel with a process in the reading unit. Therefore, a period in which the reading unit performs a process and a period in which the decompressing unit and the checking unit perform processes are such as those shown in FIG. 10B. As can be seen from FIGS. 10A and 10B, the overall processing time T2 in the present embodiment is shorter than the overall processing time T1 in the second conventional technique.

As described above, according to the present embodiment, an error in decompression of compressed data can be promptly detected without the actual printing speed in the inkjet printing apparatus 1 becoming lower than its original printing speed.

In addition, in the present embodiment, when the checking unit 15 determines that the post-decompression data size is not correct, the control unit 17 performs, for example, the process of stopping print output or the process of notifying an operator of an error. Since these processes are performed on a page-by-page basis, wasteful print output occurring when decompression of compressed data has not been correctly performed is restrained.

<5. Others>

Although in the above-described embodiment, description is made by using, as an example, the print control apparatus 10 of the inkjet printing apparatus 1, the present invention is not limited thereto. The present invention can also be applied to a print control apparatus 10 of a printing apparatus other than the inkjet printing apparatus 1 as long as the printing apparatus generates data for print output by performing the decompression process on compressed data.

In addition, although in the above-described embodiment, the configuration is such that a check as to whether the decompression process has been correctly performed is performed on a page-by-page basis, the present invention is not limited thereto. For example, by including, for each data for one main scanning line, the above-described break data in compressed data transmitted from the host 30, a check as to whether the decompression process is correctly performed can be performed on a main-scanning-line-by-main-scanning-line basis.

Furthermore, although in the above-described embodiment description is made by using, as an example, the case in which run-length compression is performed, the present invention is not limited thereto. The present invention can also be applied to the case in which data compressed by any other scheme than run-length compression is transmitted to a printing apparatus.

While the invention has been described in detail, the foregoing description is in all aspects illustrative and not restrictive. It is understood that numerous other modifications and variations can be devised without departing from the scope of the invention.

Note that the present application claims priority to Japanese Patent Application No. 2012-068921 titled "Print Control Apparatus, Print Control Program, and Print Control Method," filed on Mar. 26, 2012, the content of which is incorporated herein by reference.

What is claimed is:

1. A print control apparatus that receives compressed data obtained by compressing data to be printed, and generates data for print output by decompressing the compressed data, the print control apparatus comprising:
 a storage unit that stores the compressed data transmitted from an external source;
 a reading unit that reads the compressed data from the storage unit on a unit data by unit data basis, the unit data being a predetermined block;
 a decompressing unit that performs a decompression process on the compressed data read by the reading unit; and
 a checking unit that checks whether a post-decompression data size of each unit data obtained by the decompression process performed by the decompressing unit is correct, wherein
 each unit data in the compressed data includes break data as first data and includes, as data following the break data, density data, the number of which is according to a data size in a compressed state, the break data including information on the data size in the compressed state and information on the post-decompression data size,
 the checking unit determines whether the post-decompression data size of each unit data is correct, based on information on the post-decompression data size included in corresponding break data, and
 during a period in which the decompressing unit performs the decompression process on certain unit data and during a period in which the checking unit checks the certain unit data, the reading unit can read compressed data for next unit data from the storage unit.

2. The print control apparatus according to claim 1, wherein
 the decompressing unit turns on a decompression flag during a period in which the decompression process is performed on the compressed data, the decompression flag being a flag indicating whether the decompression process is performed, and
 the checking unit obtains the post-decompression data size of each unit data by counting a period in which the decompression flag is turned on.

3. The print control apparatus according to claim 2, wherein
 the reading unit includes, as non-processing data, the break data in the compressed data to be subjected to the decompression process by the decompressing unit, the non-processing data not being subjected to the decompression process, and
 when the decompressing unit detects the non-processing data, the decompressing unit turns off the decompression flag.

4. The print control apparatus according to claim 1, further comprising a control unit that instructs to stop print output performed based on the data for print output, when the checking unit determines that the post-decompression data size is not correct.

5. An inkjet printing apparatus comprising: a print control apparatus that receives compressed data obtained by compressing data to be printed, and generates data for print output by decompressing the compressed data; and a printing unit that performs printing on print paper based on the data for print output, wherein
 the print control apparatus includes:
 a storage unit that stores the compressed data transmitted from an external source;
 a reading unit that reads the compressed data from the storage unit on a unit data by unit data basis, the unit data being a predetermined block;
 a decompressing unit that performs a decompression process on the compressed data read by the reading unit; and
 a checking unit that checks whether a post-decompression data size of each unit data obtained by the decompression process performed by the decompressing unit is correct,
 each unit data in the compressed data includes break data as first data and includes, as data following the break data, density data, the number of which is according to a data size in a compressed state, the break data including information on the data size in the compressed state and information on the post-decompression data size,
 the checking unit determines whether the post-decompression data size of each unit data is correct, based on information on the post-decompression data size included in corresponding break data, and
 during a period in which the decompressing unit performs the decompression process on certain unit data and during a period in which the checking unit checks the certain unit data, the reading unit can read compressed data for next unit data from the storage unit.

6. A non-transitory computer-readable recording medium having recorded thereon a print control program for causing a print control apparatus, which receives compressed data obtained by compressing data to be printed and generates data for print output by decompressing the compressed data, to execute:
- a storing step of storing the compressed data in a predetermined storage unit;
- a reading step of reading the compressed data from the storage unit on a unit data by unit data basis, the unit data being a predetermined block;
- a decompressing step of performing a decompression process on the compressed data read in the reading step; and
- a checking step of checking whether a post-decompression data size of each unit data obtained by the decompression process in the decompressing step is correct, wherein
- each unit data in the compressed data includes break data as first data and includes, as data following the break data, density data, the number of which is according to a data size in a compressed state, the break data including information on the data size in the compressed state and information on the post-decompression data size,
- in the checking step, whether the post-decompression data size of each unit data is correct is determined, based on information on the post-decompression data size included in corresponding break data, and
- during a period in which the decompression process on certain unit data is performed in the decompressing step and during a period in which the certain unit data is checked in the checking step, compressed data for next unit data can be read from the storage unit in the reading step.

7. The non-transitory computer-readable recording medium according to claim 6, wherein
- in the decompressing step, a decompression flag is turned on during a period in which the decompression process is performed on the compressed data, the decompression flag being a flag indicating whether the decompression process is performed, and
- in the checking step, the post-decompression data size of each unit data is obtained by counting a period in which the decompression flag is turned on.

8. The non-transitory computer-readable recording medium according to claim 7, wherein
- in the reading step, as non-processing data, the break data is included in the compressed data to be subjected to the decompression process in the decompressing step, the non-processing data not being subjected to the decompression process, and
- in the decompressing step, when the non-processing data is detected, the decompression flag is turned off.

9. The non-transitory computer-readable recording medium according to claim 6, wherein the print control program causes the print control apparatus to further execute a controlling step of instructing to stop print output performed based on the data for print output, when determined that the post-decompression data size is not correct in the checking step.

10. A print control method for generating data for print output by decompressing compressed data obtained by compressing data to be printed, the method comprising:
- a storing step of storing the compressed data in a predetermined storage unit;
- a reading step of reading the compressed data from the storage unit on a unit data by unit data basis, the unit data being a predetermined block;
- a decompressing step of performing a decompression process on the compressed data read in the reading step; and
- a checking step of checking whether a post-decompression data size of each unit data obtained by the decompression process in the decompressing step is correct, wherein
- each unit data in the compressed data includes break data as first data and includes, as data following the break data, density data, the number of which is according to a data size in a compressed state, the break data including information on the data size in the compressed state and information on the post-decompression data size,
- in the checking step, whether the post-decompression data size of each unit data is correct is determined, based on information on the post-decompression data size included in corresponding break data, and
- during a period in which the decompression process on certain unit data is performed in the decompressing step and during a period in which the certain unit data is checked in the checking step, compressed data for next unit data can be read from the storage unit in the reading step.

* * * * *